No. 686,359. Patented Nov. 12, 1901.
F. SINGER.
APPARATUS FOR TURNING GREEN MALT.
(Application filed June 1, 1901.)
(No Model.) 2 Sheets—Sheet I.

Witnesses:—

Inventor:—
Friedrich Singer
by Eustace W. Hopkins
Atty.

UNITED STATES PATENT OFFICE.

FRIEDRICH SINGER, OF MEERANE, GERMANY.

APPARATUS FOR TURNING GREEN MALT.

SPECIFICATION forming part of Letters Patent No. 686,359, dated November 12, 1901.

Application filed June 1, 1901. Serial No. 62,779. (No model.)

*To all whom it may concern:*

Be it known that I, FRIEDRICH SINGER, brewer, a subject of the King of Saxony, residing at Meerane, in the Kingdom of Saxony, German Empire, have invented a certain new and useful Improved Apparatus for Turning Green Malt, of which the following is a full, clear, and exact description.

The present invention consists of an apparatus for turning green malt, and comprises, essentially, the details of construction hereinafter set forth, and particularly pointed out in the claims.

In order to render the present specification easily intelligible, reference is had to the accompanying drawings, in which similar letters of reference denote similar parts throughout the several views.

Figure 1:
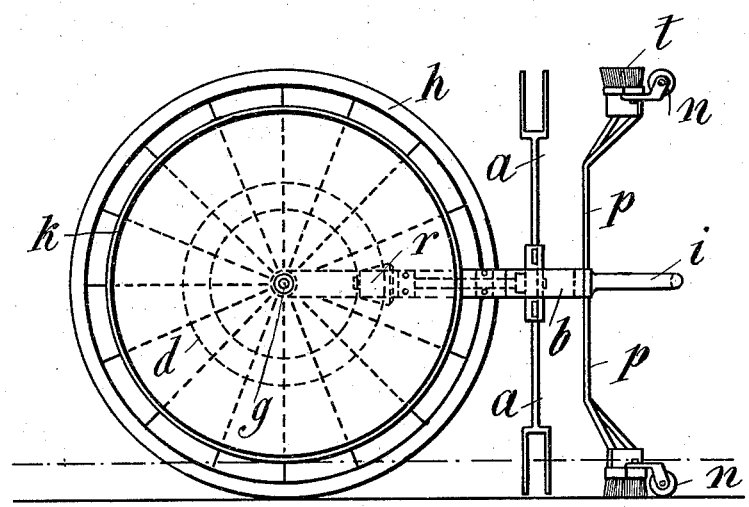
Figure 2:
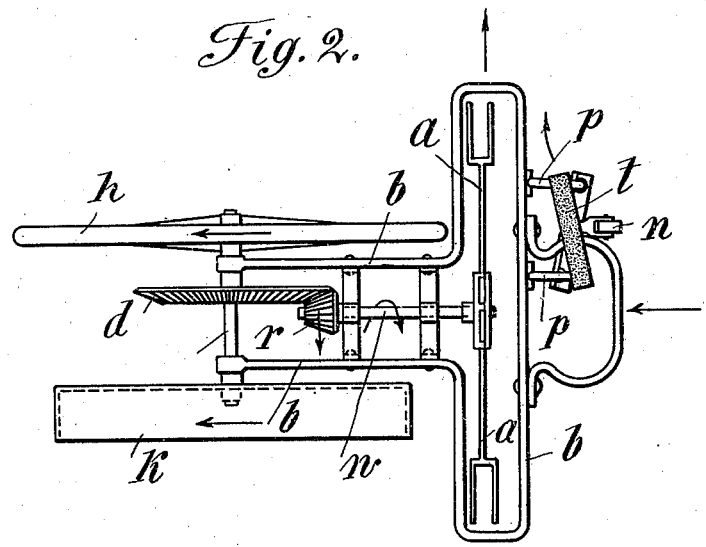
Figure 3:
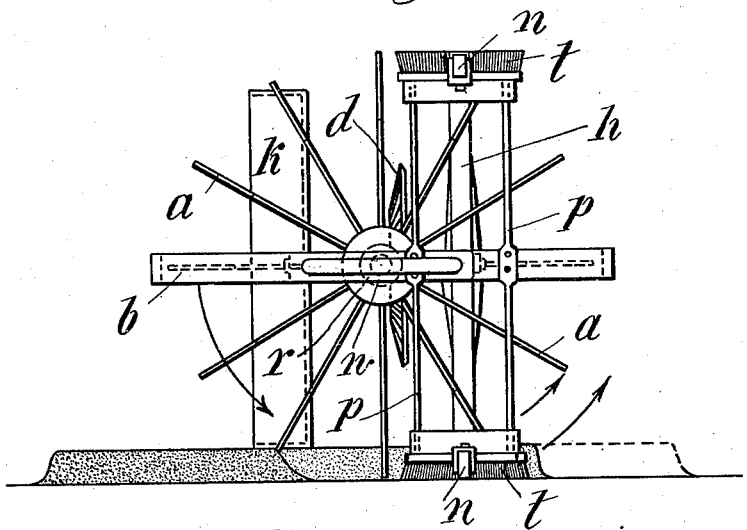
Figure 4:
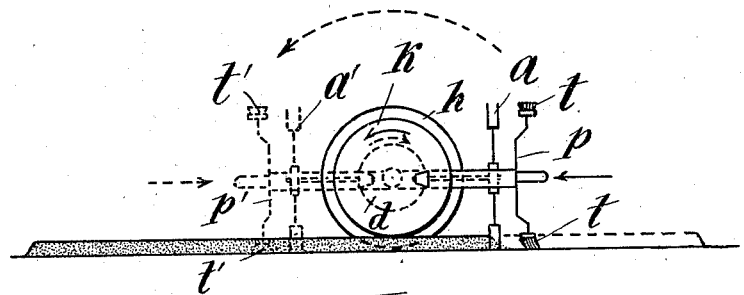
Figure 5:
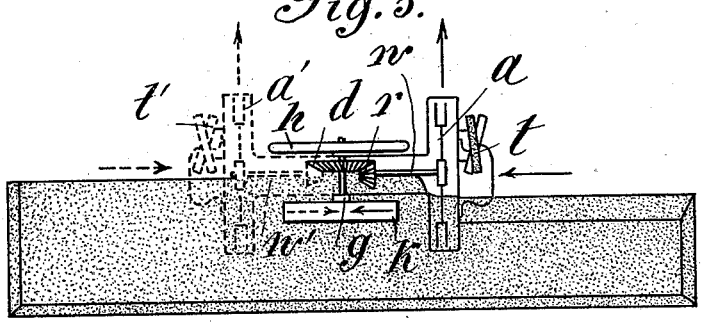

Figure 1 is a side elevation, and Fig. 2 a plan, of the machine. Fig. 3 is a rear elevation, and Figs. 4 and 5 show the positions of the parts when the apparatus is moving backward and forward.

The green malt to be turned is generally spread out in a layer of substantially even thickness on the floor of the malt-loft, and the present apparatus is adapted to run on two wheels $h$ and $k$, one of which, $h$, is of somewhat larger diameter than the other, $k$, which latter is provided with a flat comparatively broad rim and is adapted to run on the layer of green malt. The difference of diameter is provided to keep the apparatus in a horizontal position when the one wheel is running on the malt and the other on the floor, and the broad rim of the smaller wheel prevents the same from sinking into and crushing the malt. The two wheels are mounted on the axle $g$, which carries loosely the forward end of the frame $b$, and fast on the said axle the gear $d$. In the frame $b$ a second axle $w$ is mounted, lying at right angles to the axle $g$ and having a bevel-pinion $r$, adapted to mesh with the bevel-gear $d$ and be driven thereby. At the rear end of the axle $w$ a star of forks $a$ is provided, which is capable of rotating in a suitable enlargement of the said frame, the said forks being adapted to turn the malt when rotated. The rear part of the frame $b$ is further provided with rigid arms $p\ p$, carrying brushes $t$ and rolls $n$. These brushes are inclined to the direction of motion of the apparatus and serve to sweep any malt out of the path of the attendant pushing the apparatus by means of the handles $i$.

The apparatus is manipulated in the following manner: The large wheel $h$ runs on the floor at the edge of the malt layer, and the smaller broad wheel $k$ runs on the layer of malt. The attendant grasps the handle $i$ of the frame $b$, and the bevel-gear $d$, rotating with the axle $g$ of the wheels $h$ and $k$, drives the pinion $r$ of the spindle or shaft $w$, thus rotating the set of turning-forks $a$, which throw the malt in the direction of the arrows in Figs. 4 and 5. When the apparatus has been pushed the length of the floor, the frame $b$ is thrown over, as illustrated by a dotted arrow in Fig. 4 from the position indicated by full lines to that in dotted lines, and the apparatus is then pushed back again. By throwing over the frame $b$ the additional advantage is attained that the forks on the backward movement of the apparatus will be rotated in the same direction and will consequently throw the malt over in the same direction as was the case on the forward movement of the machine. When the frame is reversed, the brushes $t$ will also be reversed, so that the slant of the same will correspond to the direction of movement of the apparatus.

I claim as my invention—

1. The combination of a pair of wheels of different diameter, the smaller of which is provided with a broad rim, an axle connecting the said wheels and a frame pivotally mounted thereon, an axle mounted to revolve in said frame at substantially right angles to the said wheel-axle, a star-wheel of turning-forks fast on said frame-axle and a brush fast on the frame to sweep the floor as the apparatus is advanced and gears to drive the turning-fork axle from the carrier-wheel axle when the device is moved substantially as described.

2. The combination of a pair of wheels mounted on an axle, one of said wheels being larger than the other and a broader rim to the smaller wheel, a frame pivotally mounted on said axle and having mounted therein a shaft lying at substantially right angles to the wheel-axle, a series of fork-carrying arms mounted to rotate with the said frame-shaft, and gearing to rotate the same from the wheel-axle, a handle to the frame and a pair of brushes rigidly mounted on arms extending from the said frame in opposite directions one of said brushes being adapted to sweep the floor at the forward movement and the other at the rearward movement of the apparatus substantially as described.

In witness whereof I have hereunto set my hand in presence of two witnesses.

FRIEDRICH SINGER.

Witnesses:
HERM. SACK,
RUDOLPH FRICKE.